United States Patent [19]

Yamashita et al.

[11] Patent Number: 5,734,574
[45] Date of Patent: Mar. 31, 1998

[54] METHOD OF STORAGE CONTROL IN AN AUTOMATED STOREHOUSE AND APPARATUS THEREFOR

[75] Inventors: Tomimasa Yamashita, Kameyama; Katsuhiro Hagino, Suzuka; Hiroto Makinose, Suzuka; Kazuhiro Uchida, Suzuka, all of Japan

[73] Assignee: Honda Giken Kogyo Kabushiki Kaisha, Tokyo, Japan

[21] Appl. No.: 576,476

[22] Filed: Dec. 21, 1995

[30] Foreign Application Priority Data

Dec. 22, 1994 [JP] Japan .................................. 6-320972
Oct. 17, 1995 [JP] Japan .................................. 7-268402

[51] Int. Cl.⁶ .................... B07C 17/00; G06F 17/00; B65G 1/00
[52] U.S. Cl. .................... 364/478.03; 364/478.02; 414/268; 414/269
[58] Field of Search .................... 364/478.02, 478.03; 414/274, 268, 269, 266, 286, 273

[56] References Cited

U.S. PATENT DOCUMENTS

| | | | |
|---|---|---|---|
| 4,109,808 | 8/1978 | Hamada et al. | 414/786 |
| 4,932,828 | 6/1990 | Katae et al. | 414/286 |
| 5,340,262 | 8/1994 | Tsujimoto et al. | 414/273 |
| 5,403,147 | 4/1995 | Tanaka | 414/786 |
| 5,568,393 | 10/1996 | Ando et al. | 364/478.02 |

*Primary Examiner*—Reba I. Elmore
*Assistant Examiner*—Robert J. Dolan
*Attorney, Agent, or Firm*—Dickstein Shapiro Morin & Oshinsky LLP

[57] ABSTRACT

A method of storage control of component works in an automated storehouse, including a plurality of shelf equipment for storage/delivery of component works conveyed by a plurality of transporters, and an apparatus therefor are provided. The control method comprising the steps in that the shelf-array equipment storage status is confirmed in step S11, a shelf-array containing an empty shelf is extracted in S12, the specification information is entered in S13, and the stored work having the same specification information as that to be stored is retrieved, and a shelf containing the minimum number of works is decided as the target location (in S14 to 17).

2 Claims, 14 Drawing Sheets

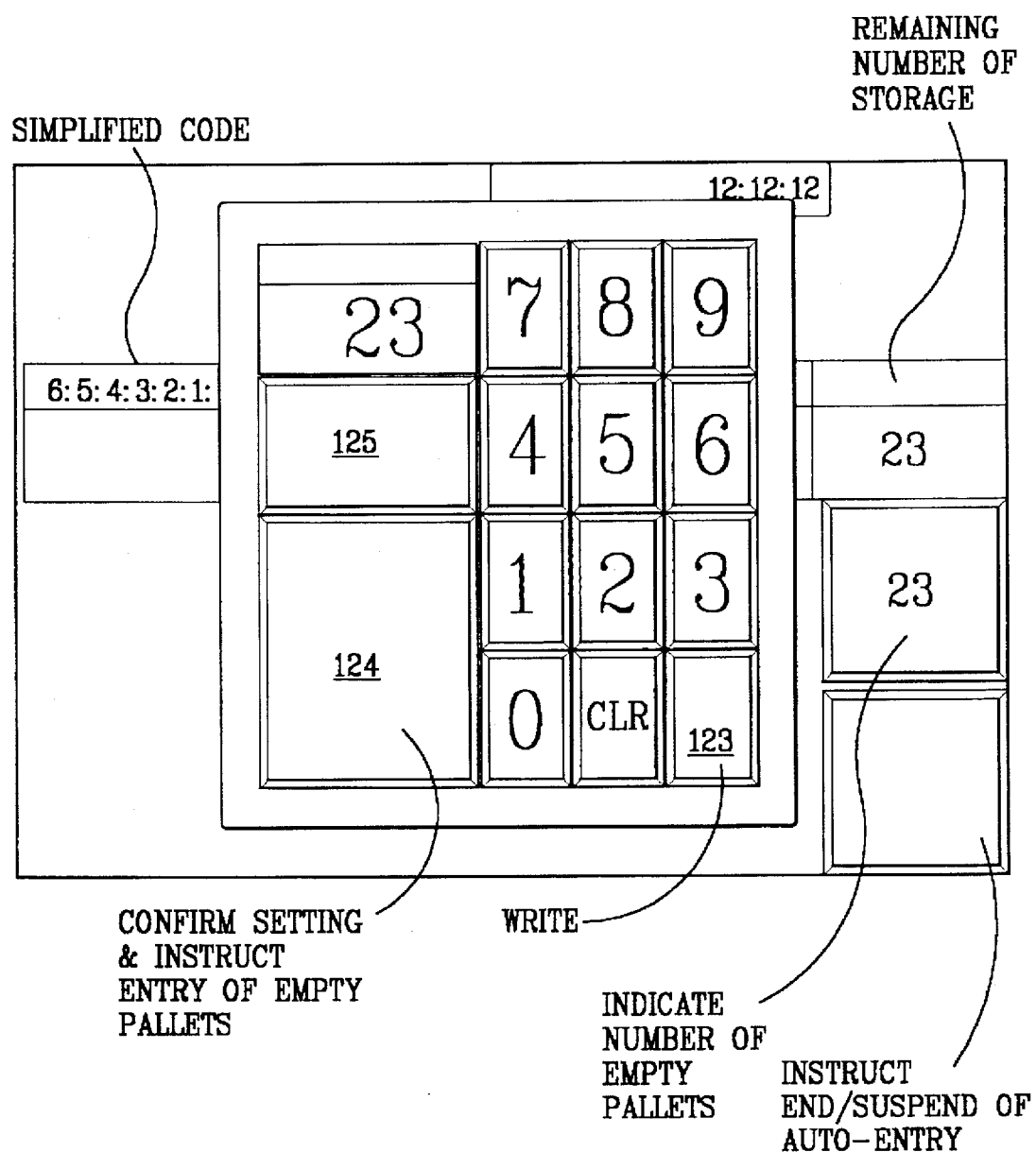

METHOD OF STORAGE CONTROL IN AN AUTOMATED STOREHOUSE AND APPARATUS THEREFOR

BACKGROUND OF THE INVENTION

1. Field of the Invention

The present invention relates to a method of storage control in an automated storehouse and apparatus therefor.

2. Brief Description of the Prior Art

It is important to store a necessary quantity of component works and to quickly deliver for the production line, and also important, in order to continuously store and deliver thereof, to automatically convey and store the works on the adequate shelves, automatically take out desired works, and again transfer to deliver thereof.

FIG. 9 is a schematic view of an automated storehouse system for managing the stock condition of production component works by controlling the storehouse facility in a manufacturing plant. The automated storehouse system therein comprises a plurality of storehouse facilities 1, a storage conveyor 2a and a delivery conveyor 2b for conveying works, respectively, for storage in and delivery from each of shelves 6 of the shelf equipment 5, and a control device 3 for controlling the operation of the conveyors 2a and 2b.

The storage conveyor 2a and delivery conveyor 2b are installed: the former upstairs, while the latter downstairs.

Each of component works is placed on a pallet, conveyed through a storage inlet 2c provided for entry of the conveyor 2a and stored in a location in an indicated storehouse 1, and delivered through and out of a delivery outlet 2d provided for exit of the conveyor 2b. For communication between outlet 2d and inlet 2c, a lift 4 is provided.

The storehouse equipment 1 of FIG. 9 is specifically illustrated in FIG. 10. The equipment i comprises a transporter 11 and the shelf equipment 5 which is formed of a shelf-array 6 composed of a plurality of work shelves 12 arranged lengthwise and crosswise for storing component works therein.

The transporter 11, on which pallets having works are placed, transports pallets and is driven by a guiding control device 14, along a track 15 from conveyors 2a and 2b to an indicated lateral location of the shelf, and the works are lifted by an elevator ahead to the indicated shelf 12a to store the same thereon.

The control system for the automated storehouse of FIG. 10 is schematically illustrated in FIG. 11, wherein the system includes a sequence controller 31 for controlling the entire sequence concerning storage in and delivery out of the storehouse, a conveyance control device 32 for controlling both storage and delivery conveyors 2a and 2b, and a display 33 for instructing storage and delivery with monitoring the proceeding of the storage/delivery status.

The sequence controller 31 includes, in addition to control means, an input/output interface 31a for controlling the sequence itself; a communication interface 31b for treating the communication between the output thereof and a (not illustrated in FIG. 11) support system; and managing means 31c for collectively managing each interface of the output/ input thereof and telecommunication therebetween, recognizing the status of each automated storehouse by introducing the status information of such storehouse and creating a control data to transmit such data: thereby controlling the conveyors 2a and 2b by means of a conveyance control device 32, and guiding the transporters 11 by means of a guiding control device 14.

The display means 33 is connected to the control means 31c through the I/O interface 31a, instructing storage/ delivery with monitoring the sequence control of storage/ delivery, is enforced by a software for controlling an automated storehouse.

FIG. 12 is a flow chart illustrating a general procedure for controlling the storehouse shown in FIG. 11. Such a control comprises the following steps: Step S1 establishes management items to be in advance set up in control device 31c; Step S2 instructs storage/delivery of works to be stored/ delivered by means of display 33; Step S3 allows the control device 31c to control the sequence relating to management items according to storage/delivery instructions; and Step S4 allows the control device 31c to update, based on the result of the sequence control, the management items: thereby operating each component of the storehouse to perform management of the stock condition.

The management items mentioned above include also specification information which specifies the specification relating to the forms of component works, and shelf data indicating stock condition of the works within each of shelves 12.

In some cases, the stored works having the same specification were likely to accumulate within one or few number of shelf-arrays, since the works were stored in a simple manner, namely, in an empty shelf-array according to the order of the serial number.

For example, when the No. 1 shelf-array is full, and No. 2 and thereunder still remain empty, the entry of works having the same specification is accumulated in No. 2 array. Such a status would surely disturb the delivery of works and sustain the proper production, especially when the lift or transporter associated with No. 2 array is troubled.

Also, the cycle time would be elongated, which also would result in elongated delivery time, because of the continuous delivery from the single shelf, compared with the parallel delivery from a plurality of shelf-arrays.

SUMMARY OF THE INVENTION

In view of the above-described problems, the present invention provides a method of storage control of component works in an automated storehouse comprising the steps of: reviewing stock condition of work components to extract shelf equipment containing empty shelves; retrieving stored works having specification information the same as that of works to be entered into said storehouse; extracting shelf equipment containing a minimum amount of stored works having the same specification information, and designating the selected shelf as the storage target.

In another aspect of the invention, a method of storage control according to the invention has the feature that: the number of stored works having specification information the same as that of works to be entered into said storehouse, obtained with respect to each shelf equipment, is added to the number of works to be storage entered having the same specification information; and retrieving the number resulting from said addition as the stored number of shelf equipment.

In a still another aspect of the invention, a storage control apparatus for component works in an automated storehouse comprises: means for reviewing stock condition of work components to extract shelf equipment containing empty shelves; means for retrieving stored works having specification information the same as that of works to be entered into said storehouse; and means for extracting shelf equipment containing a minimum amount of stored works having the same specification information.

BRIEF DESCRIPTION OF THE DRAWINGS

FIGS. 7(a) to (d) show display screens for displaying the automatic entry mode of empty pallets;

DETAILED DESCRIPTION OF THE PREFERRED EMBODIMENTS

Figure 1:
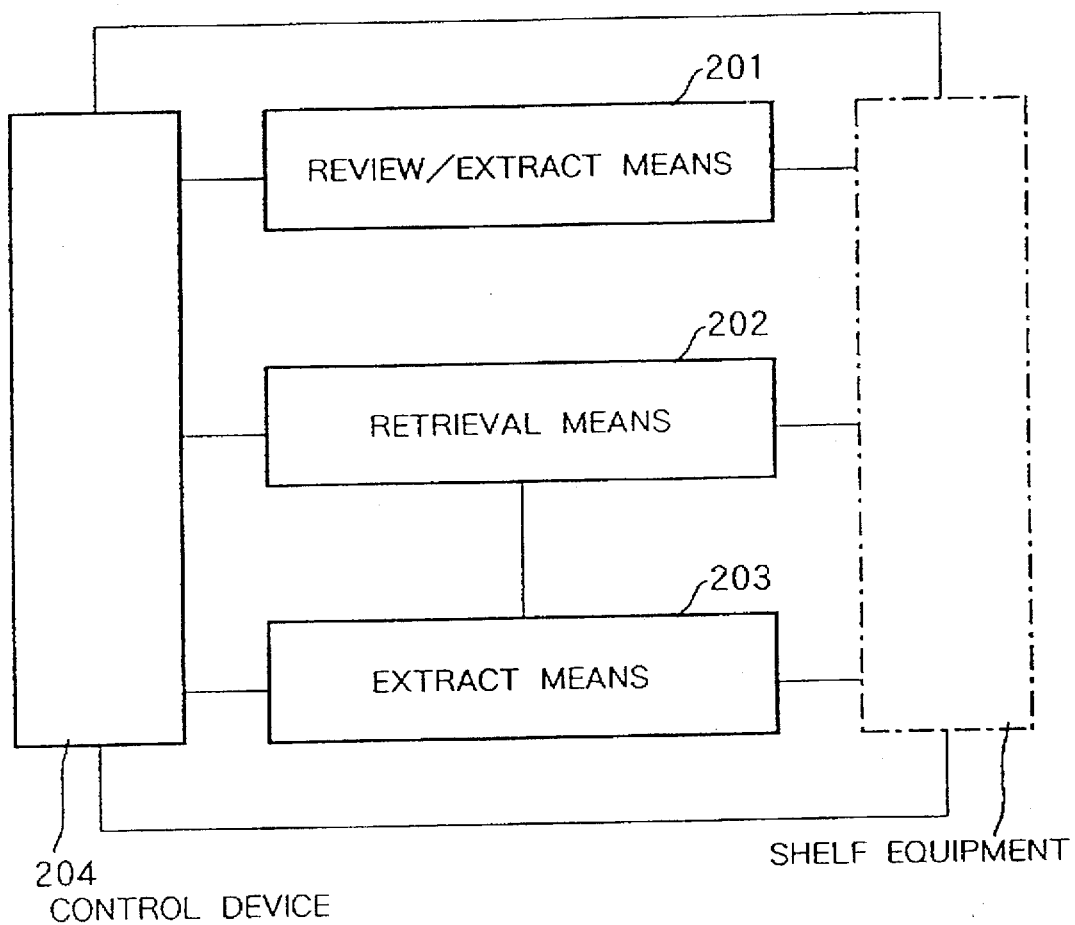
FIG. 1 is a block diagram in accordance with a storage control apparatus of the present invention.

Referring now to FIG. 1, a storage control apparatus according to the present invention includes a review/extract means 201 for reviewing of stock condition and extracting empty pallets, retrieval means 202 for retrieving stored works having the same specification information as that of works to be entered, extract means 203 for extracting shelf equipment containing a minimum amount of stored works having the same specification information, and control means 204 for performing entire control so as to select the extracted shelf equipment as the target storage location of the works to be entered, and to correctly deliver the designated component works to the extracted storage location.

Figure 9:
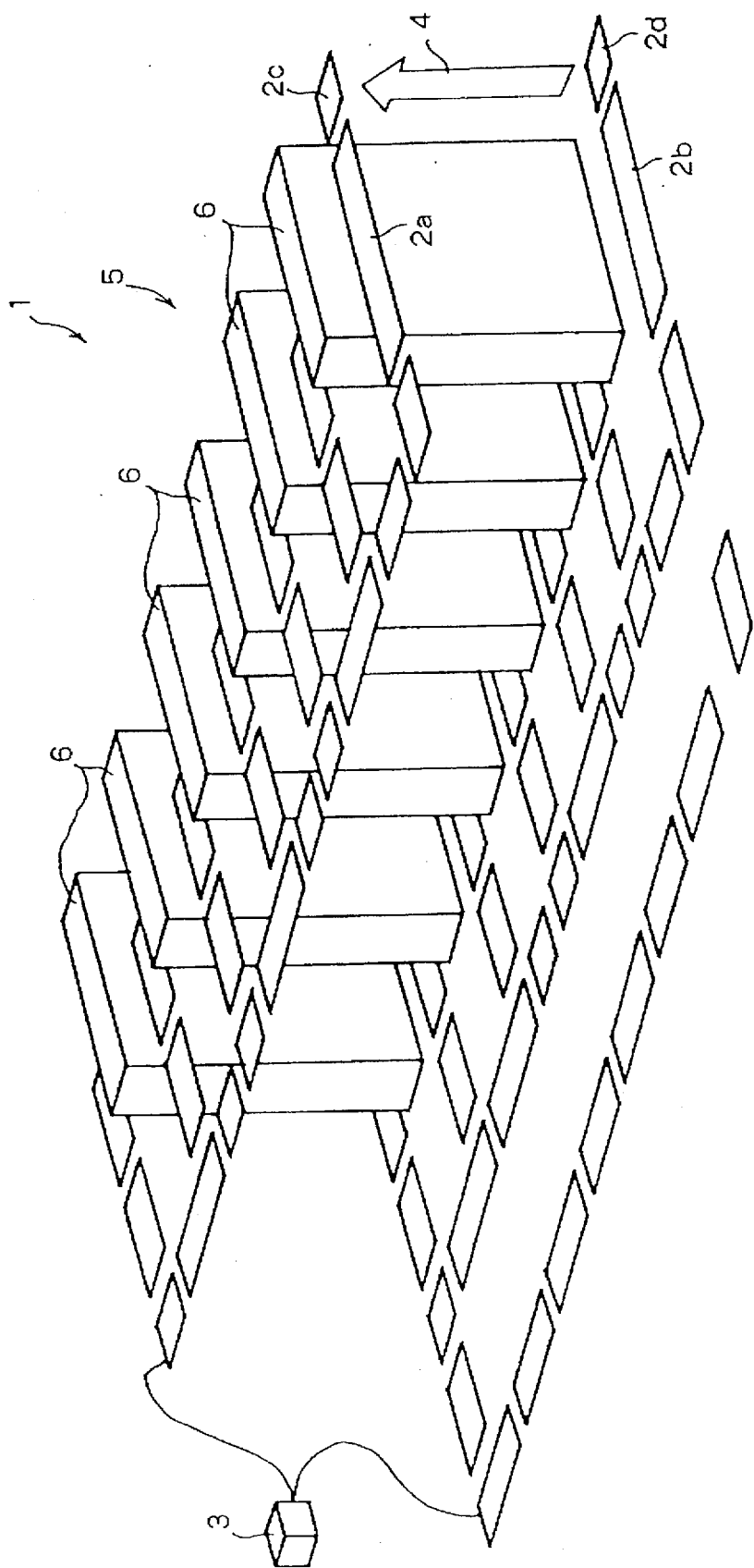
FIG. 9 is a perspective view of the summary construction of an automated storehouse system.
Figure 10:
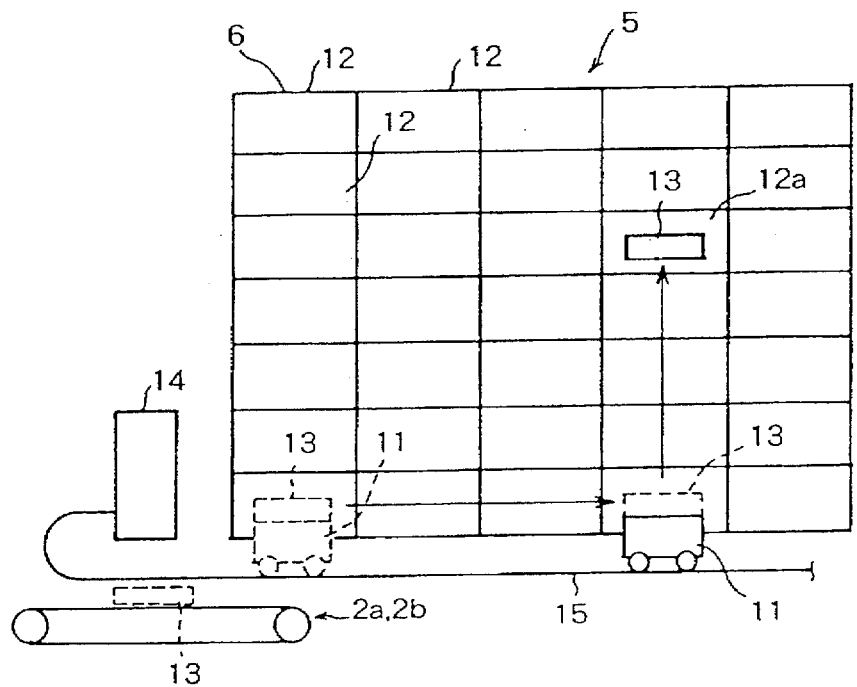
FIG. 10 is a schematic view illustrating storage operation of the system.

The construction other than the above is the same as that shown in FIGS. 9 and 10.

Figure 2:
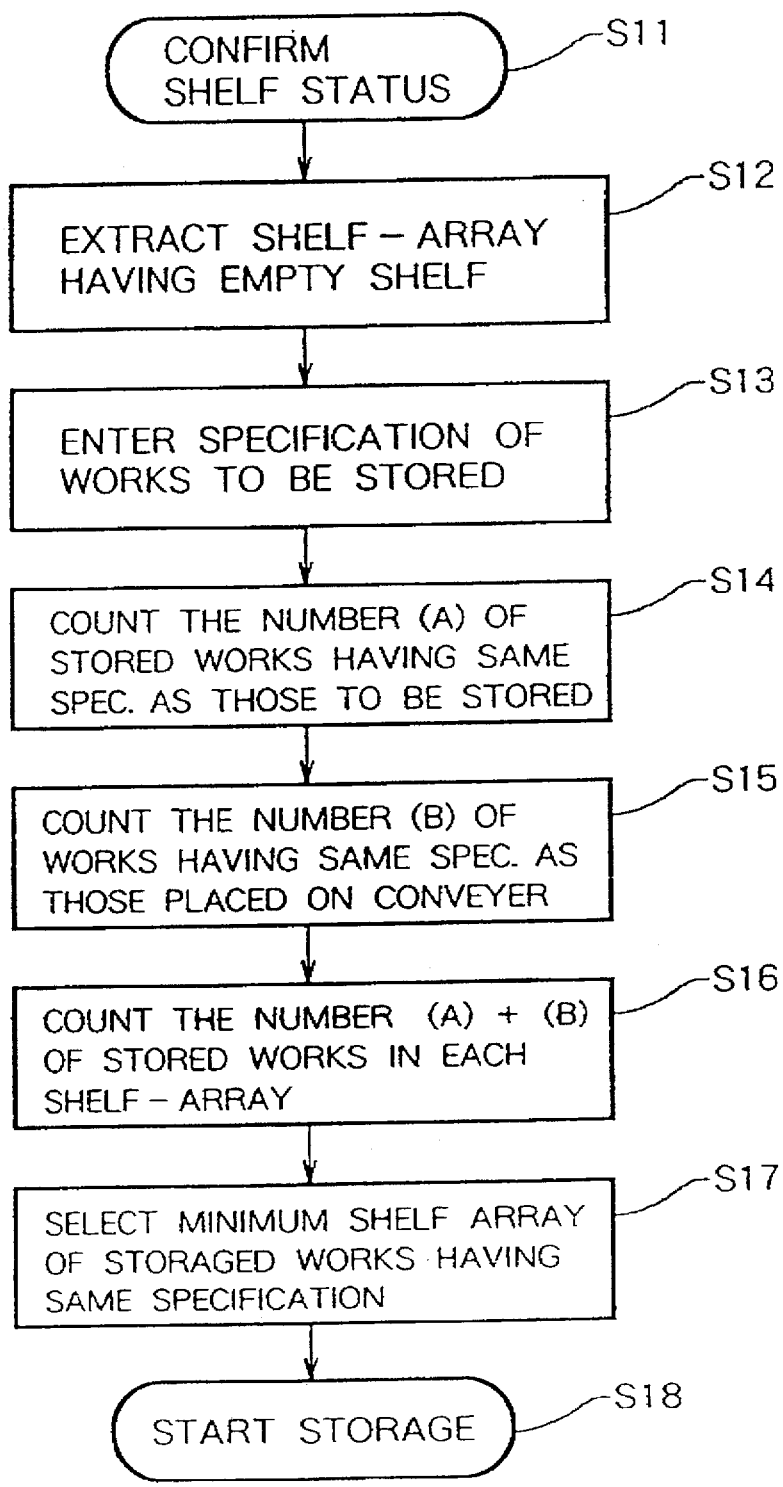
FIG. 2 a flow chart in accordance with a preferred embodiment of determining a target storing location in an automated storehouse.
Figure 12:
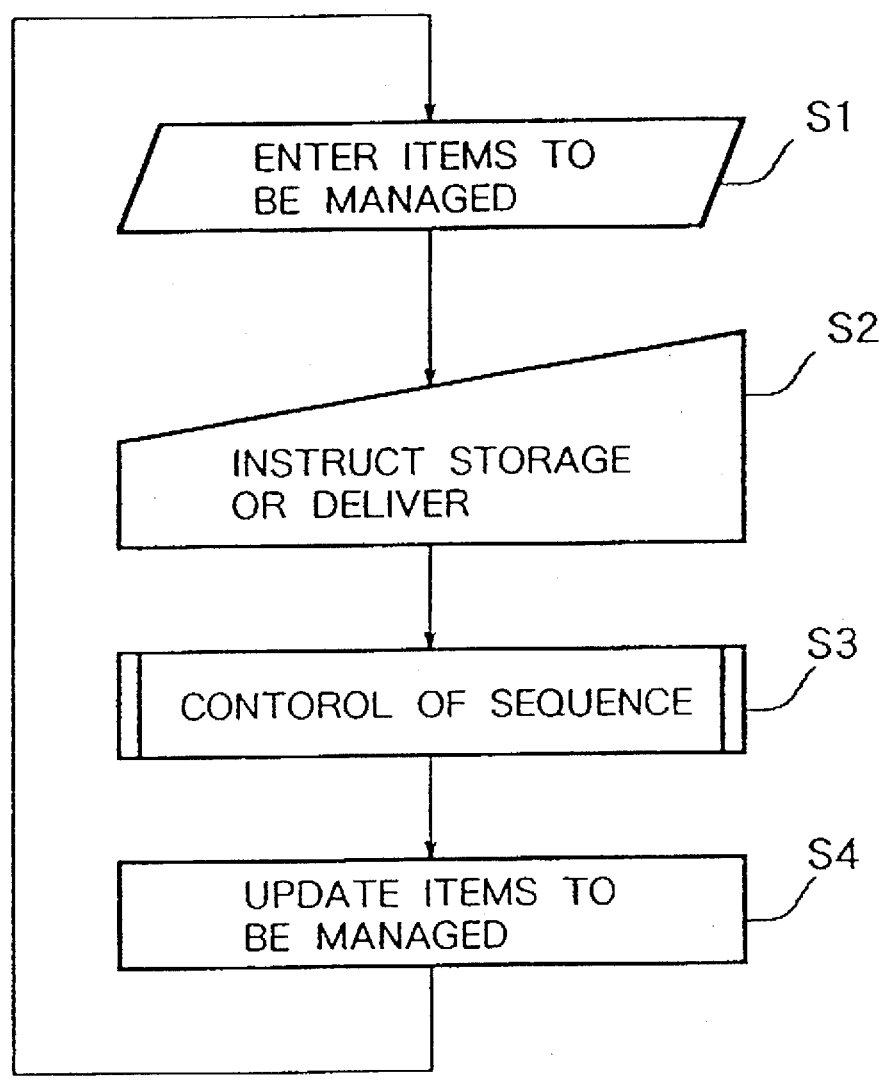
FIG. 12 is a flow chart illustrating a general procedure for controlling the storehouse shown in FIG. 11.

The process of deciding the target storage location for the works will be described with reference to FIG. 2, which process is included in steps S2 and S3 shown in FIG. 12.

First, the Step S11 confirms the status of each shelf-array step, S12 extracts a shelf-array containing empty shelves, step S13 enters the specification information of works, such as model and color of each of works to be stored, and step S14 searches the storage within the extracted shelf-array and counts the number A of stored works having the same specification as those to be stored.

Then, step S15 counts the number B of pallets, and the number of works placed thereon, having the same specification on the storage conveyor which is just conveying the works to each shelf-array. Step S16 counts the addition of the number A of step S14 with the number B of step S15 to obtain the sum A+B. Thereby, step S17 selects the shelf-array containing the minimum of stored works having the same specification, and step S18 starts storing of works into the selected shelf-array.

When there are a plurality of shelf-arrays each containing a minimum number of works, an array having the smaller or smallest serial number is selected.

In the case of a transporter 11 having trouble, the shelf-array associated with the transporter is removed from the count, and only the arrays with operable transporters are counted. When the transporter has recovered from the trouble, the array associated therewith is again to be counted. As a result, the count of the arrays out of use is omitted, and the speed of counting is improved.

Figure 3:
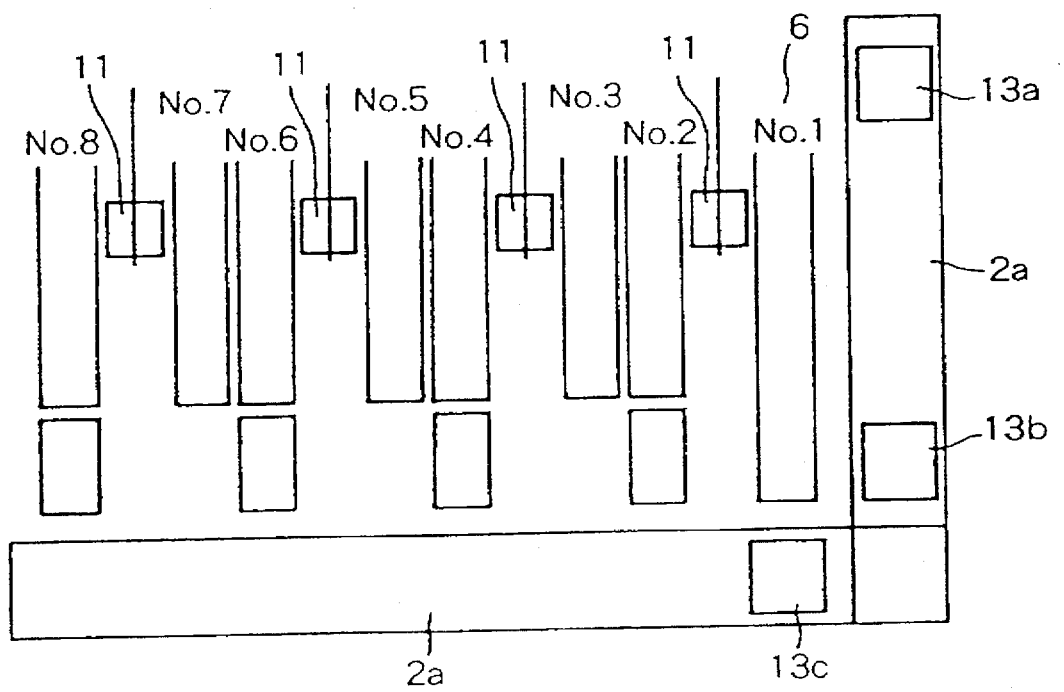
FIG. 3 is a schematic diagram more specifically illustrating the procedure of determining a target storing location.

FIG. 3 illustrates more specifically the process of determining the target storing location. As shown, in the shelf-arrays No. 1 to 8, when the numbers of stored works having the same specification are 5, 7, 2, 5, 9, 11, 12 and 8, respectively, and there are 3 pallets to be stored into the shelf-array 6 which is numbered No. 1 on a storage conveyor 2a, then the number of storage in the array No. 1 is deemed 8 as the sum of 5 and 3. Since the storage in array No. 3 is only 2, the shelf-array No. 3 is selected as the array containing the smallest number of storage, and the works to be entered at the next time will be entered into this array No. 6.

When there are pallets which are in the course of being transported to storage conveyor 2a, a flag is set for the shelf data which indicates the storage condition in each shelf. The flag is recognized by the second sequence controller 35 described later concerning FIG. 4, and the flag is to be cleared at the moment when the pallet is stored in the designated shelf.

Accordingly, the accumulation of stored works having the same specification is prevented, and the works are uniformly stored. Therefore, even if any of transporters is troubled, there is still a storage of works in a shelf-array of other than the troubled transporter, and the desired works can be delivered without hindrance.

When the continuous delivery of works having the same specification is necessary, as the works are uniformly stored in each shelf-array, they can be delivered in parallel from the plurality of arrays without continuously being delivered from one shelf-array.

Since the pallets in the course of being conveyed on the storage conveyor 2a are also properly counted, the number of works stored in each array is added to the number of works being conveyed by the conveyor 2a having the same specification, and therefore the stored number of works having the same specification in each shelf-array is correctly counted.

Figure 4:
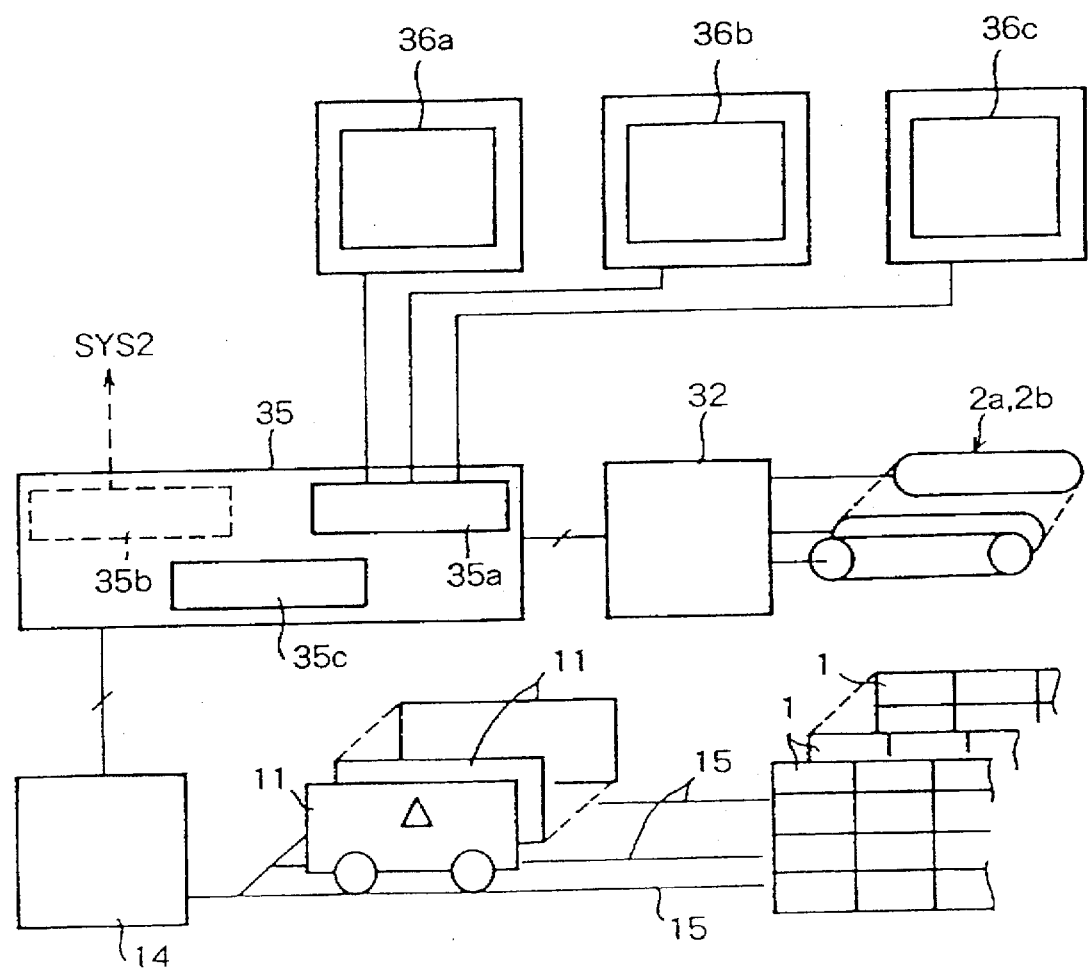
FIG. 4 is a structural diagram illustrating the apparatus on the functional basis of each component.
Figure 11:
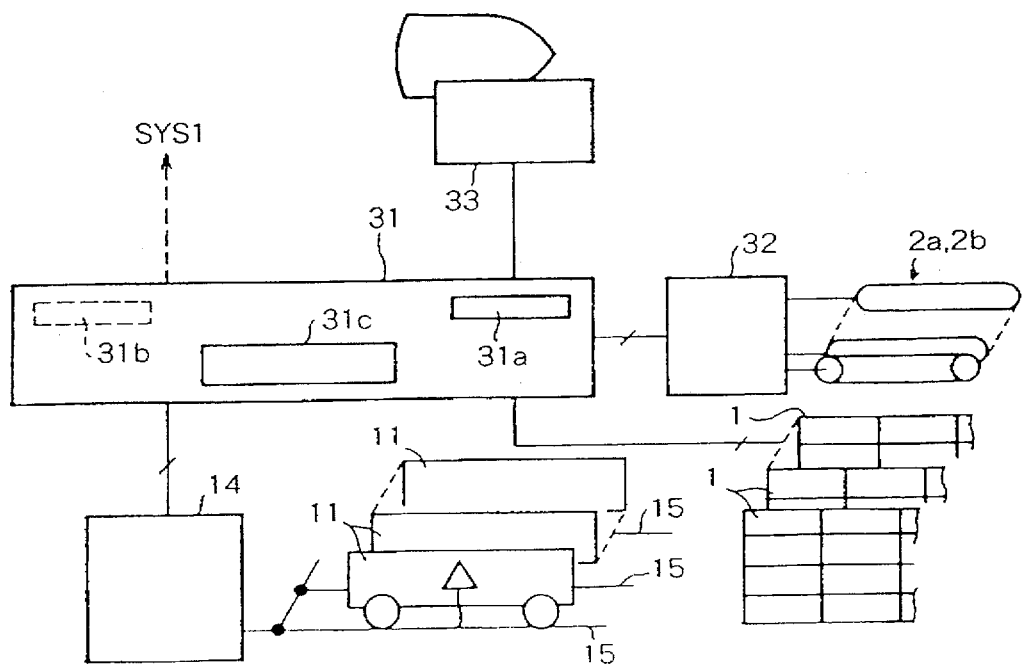
FIG. 11 is a schematic view illustrating the function of the system.

FIG. 4 is an outlined schematic illustration of the embodiment of the apparatus shown as a separate function basis. The main structure thereof includes a second sequence control device 35, and second display devices 36a, 36b and 36c comprised together, the other components being the same as those in the prior art embodiment of FIG. 11.

The second displays 36a, 36b and 36c each display a figure showing the specification of the work as products and control status of the storehouse facilities according to a predetermined form, and enters the specific location and the content of the management work to the second sequence control device 35, and indicates by pressing on the corresponding figure portion for the operator to confirm the control status to take operation relating to storage and delivery of the work.

One of the second displays 36a, is installed at the storage inlet 2c, another second display 36c at delivery outlet 2d, and is the remaining one is used for the overall monitoring and kept as a preventive device; thus each of storage, delivery and correction operation of the stock condition can be performed separately from each other.

A dual use of a display can be performed by using one or two displays. Also, in the case of combined uses, four or more devices can be used.

More specifically, the second displays 36a, 36b, 36c are composed of a well known touch panel or touch screen having a CRT or an LCD display: an initial setting of a plurality of screens to design an arbitrary figure. The second displays 36a, 36b, 36c sense pressing-on of each divided region by the operator to form an instruction corresponding to such divided region to transmit the instruction. Also, any type of display, in which a contact of any part of the operator's body can provide instruction for the automated storehouse system, may be used as necessary.

The figures may be constructed such that each portion thereof may be instructed by a touch by the body of the operator on each area of the displayed programmable screens.

The second sequence control device 35 includes an input/output interface 35a for receiving from displays 36a, 36b and 36c an instruction of storage/delivery to inform the control status of the automated storehouse; a communication interface and a management device 35c.

More specifically, device 35 is composed of a known sequence control or sequencer or the like, but alternatively another device having any programmable control means may be used.

The new reinforcement system, except for having any software for monitoring developed for the use of sequence controller 35 and second display devices 36a, 36b and 36c, is not different from the conventional reinforcement system.

The above second interface 35a has an input/output buffer for receiving the operator's instruction as indicating the species of the displayed screen associated with each of the second display devices, and serves to connect each I/O buffer to the second management device 35c through a multiplexer that allocates the indication of these species for each display and collects the reception of the indication from each such display device.

The second management device 35c includes an application program, which is comprised of a storage/delivery instruction part for receiving the instruction, managing the stock condition and displaying the same, and a state monitoring part that monitors and manages the working status. The management device 35c is connected to a second communication interface 35b via a common memory.

The above status monitor, upon occurrence of conveyance deviation or storage abnormality, implements an interrupt in accordance with the storage/delivery instruction part to initiate correction of such occurrence, and also can implement such correction separately as necessary by the operator's instruction.

Figure 5:
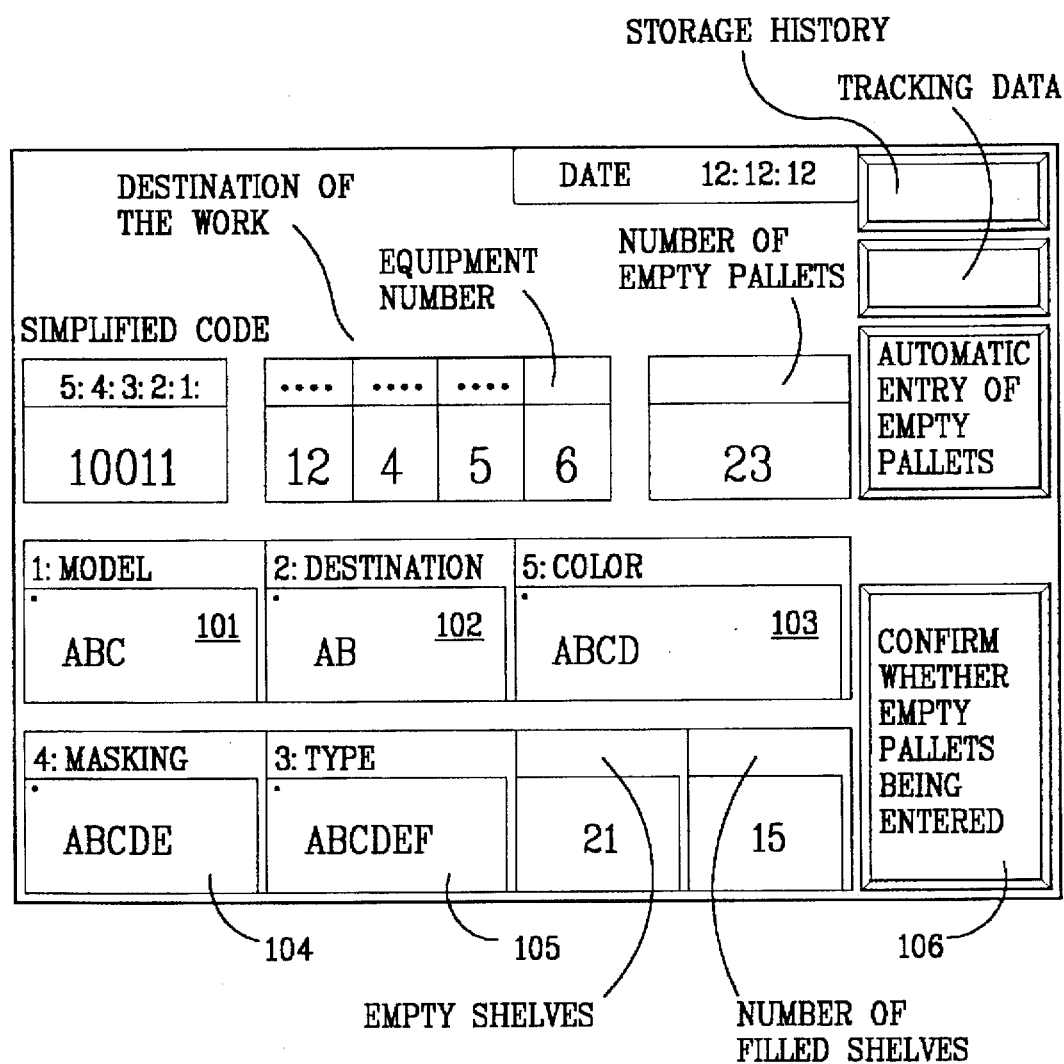
FIG. 5 is a view illustrating a displayed screen for entering a storage instruction from the second display device.

FIG. 5 is an item setting screen for storage instruction setting from the second displays 36a, 36b and 36c, including columns, each for entry: 101 of model symbol, 102 destination, 103 provided color, 104 masking, 105 type of work, and 106 Storing Setting Confirmation.

The displayed screen itself of the second display device is formed as a touch panel, having a number of separate image sections provided with figures such that when a manual pressing of either one column of which is sensed, the content of the corresponding indication thereof is transmitted.

Figure 6A:
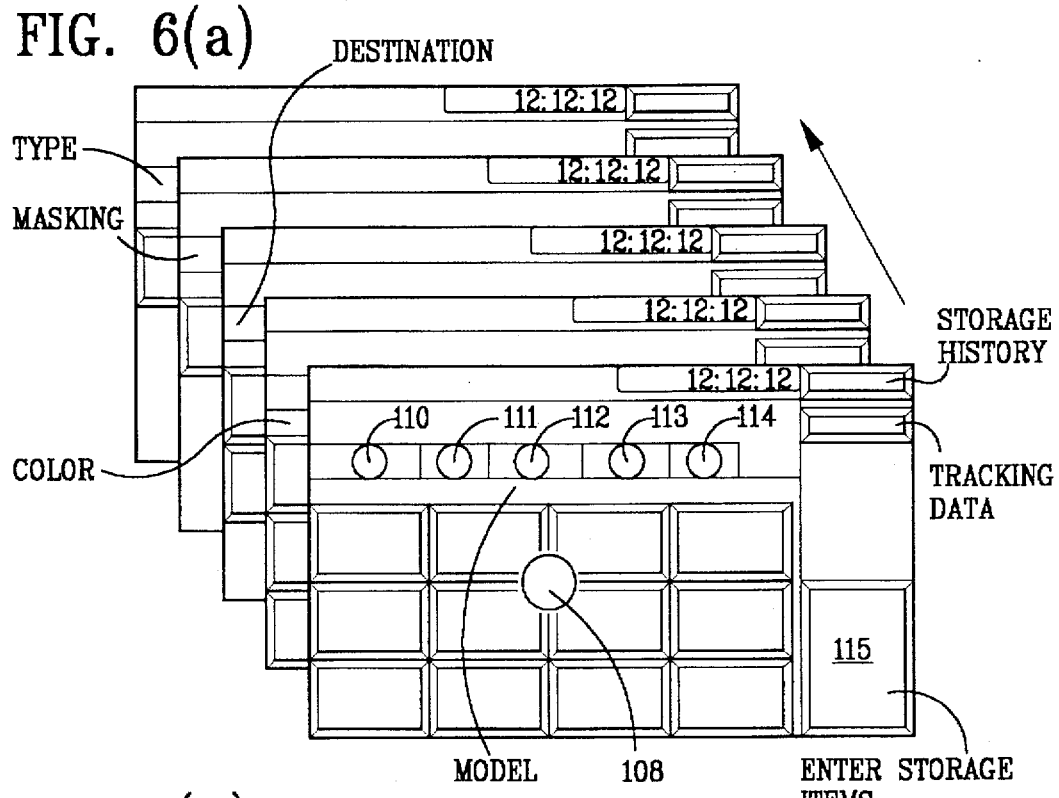
FIG. 6 is a view illustrating each screen for displaying a result of entered instruction by the second display device.

On sections 101 to 105, the immediately preceding data are displayed, and, in the case of entering the same works, the section 106 is to be pressed. FIG. 6(a) shows a plurality of, e.g. five as seen in the drawing, displayed forms which occur in succession when the setting is in part or entirely modified, such that the successive pressing of sections 101 to 105 in FIG. 5 cause a successive change of displays from "Model", through "Destination", "Color", "Masking", "Type", to "Storage entry setting" as included in FIG. 6(a). As illustrated in the utmost front image included in FIG. 6(a), each screen also has a plurality of sections including a pressing section 110 for indicating the model number, and further sections 111, 112, 113, and 114 for indicating the destination of delivery, the color, the masking, and the type, respectively. Therefore, pressing of either of sections 110 to 114 allows the same change-over selection as in the case of pressing on either of sections 101 to 105 included in FIG. 5.

Figure 6B:
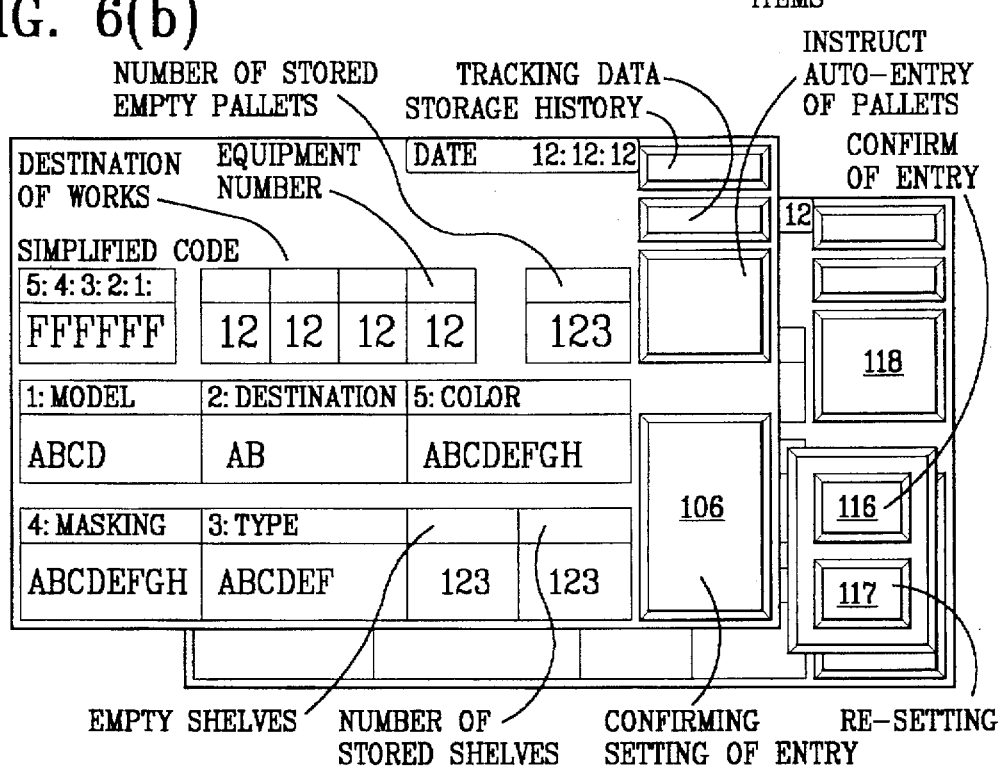

In such a manner, when the content is correct, by pressing on a section 115 indicating ENTER STORAGE, the displayed image turns to the screen shown in FIG. 6(b); after confirming the content thereof, the section 116 indicating CONFIRM, ENTER is pressed. For modification of setting, section 117 RE-SETTING is to be pressed. In addition, the section 106 of CONFIRM STORAGE SETTING without being illuminated indicates a status of inhibiting entry of storing, a flashing thereof indicates a status of allowing entry, and the section 106 being illuminated indicates a completion of entry setting.

FIGS. 7(a) to (d) are displayed screens utilizing in the process of an automatic entry of empty pallets into the storehouse facilities. Pressing on the section 118 of EMPTY PALLETS AUTO-ENTRY in the foregoing FIG. 6(b) allows display of a screen shown in FIG. 7(a). On the contrary, pressing on the section 122 for "Completion/suspension of entry of empty pallets" of the screen in FIG. 7(a) allows a return to the screen of "entry setting" in FIG. 5.

Figure 7A:
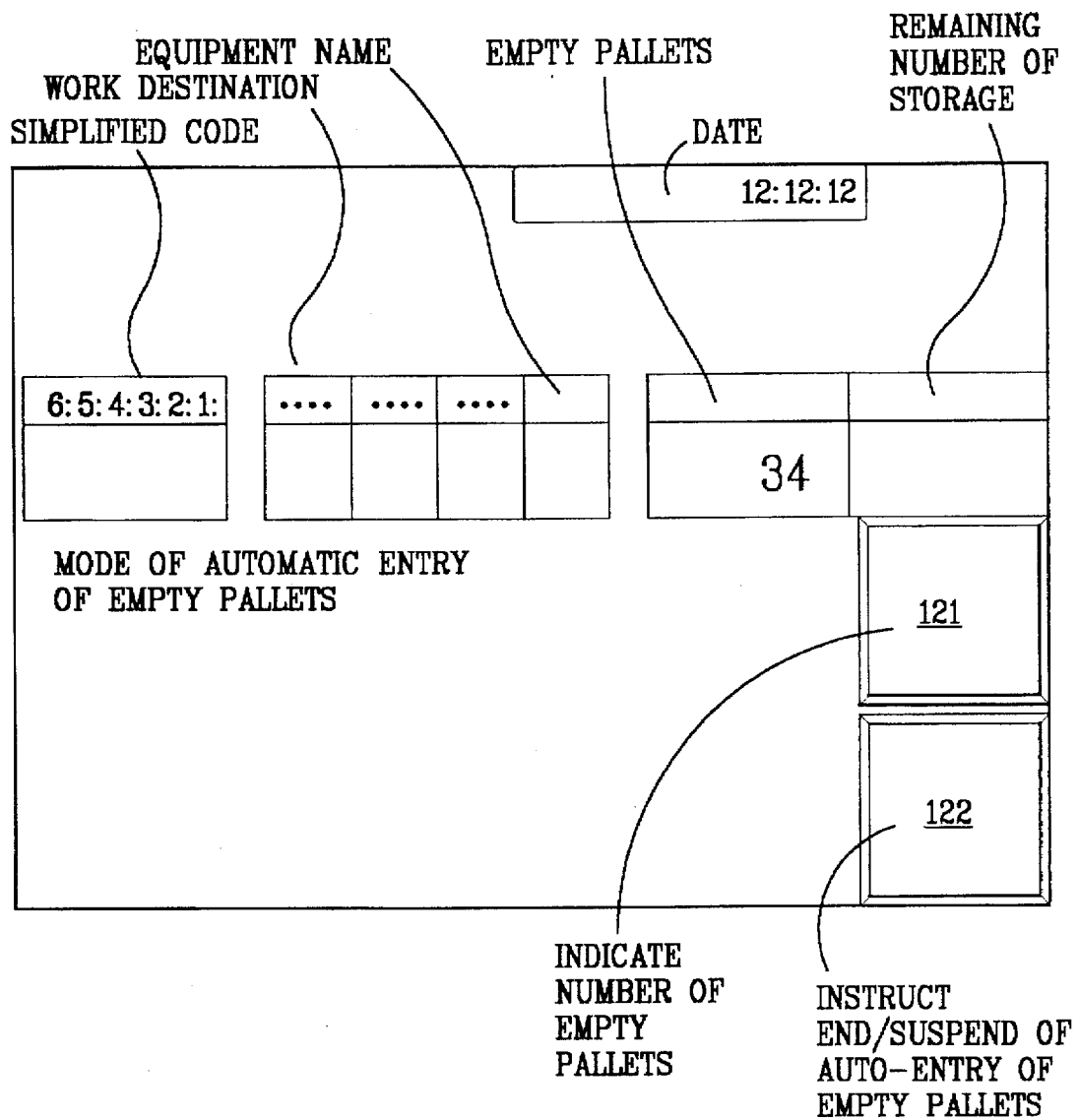
Figure 7C:
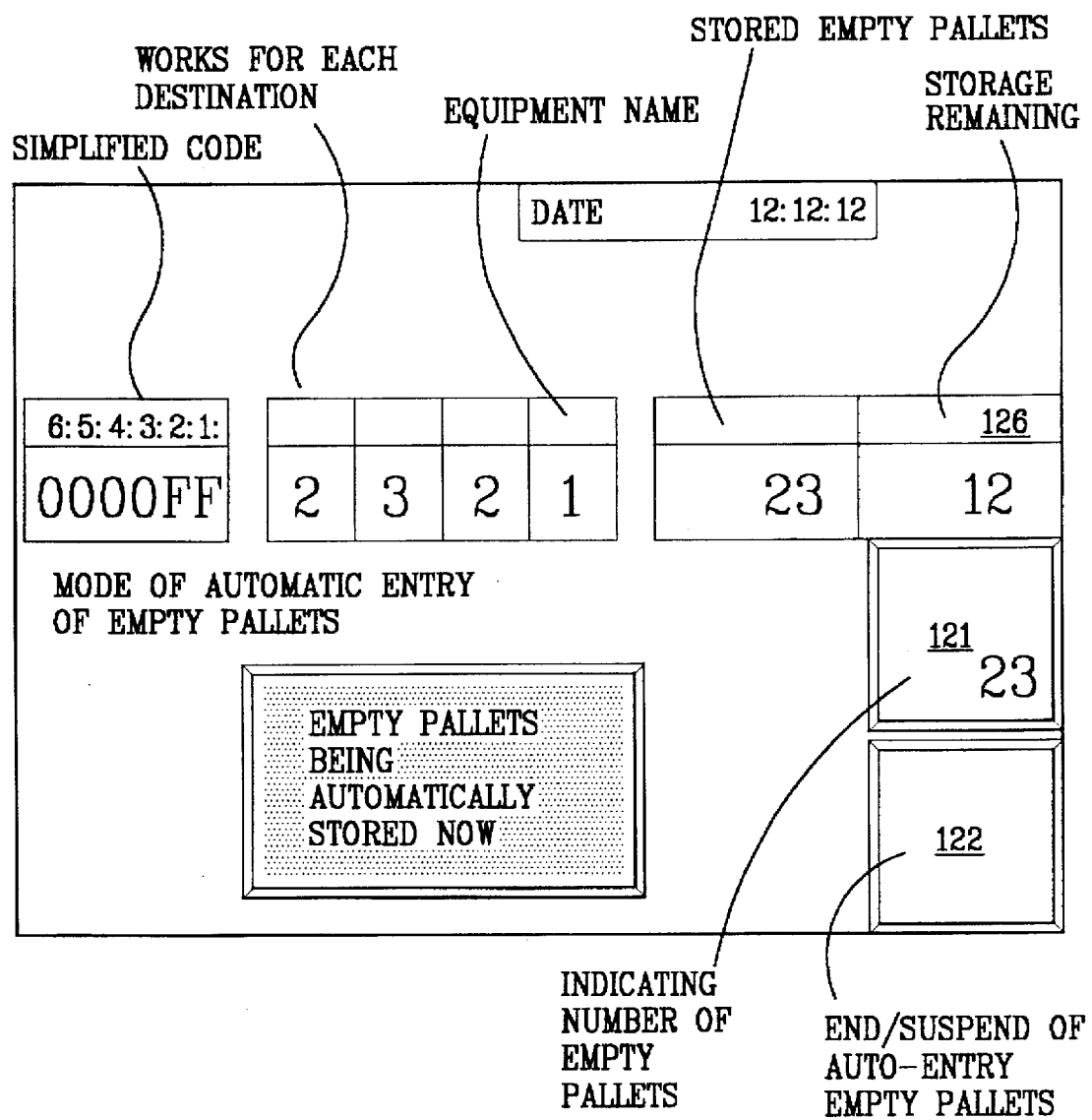

On the image of FIG. 7(b), pressing the numeral keys to enter and indicate the number of empty pallets, pressing the section 123 for writing, and, when the number is adequate, pressing the section 124 for "Confirming setting and starting entry of pallets", allows display of a screen shown in FIG. 7(c). On the contrary, when attempting to suspend the setting, the Suspension of Setting section 125 is to be pressed.

The screen shown in FIG. 7(c) displays a status for entering the setup number of empty pallets to be automatically stored, an indication "Empty Pallets Being Automatically Entered" is displayed at the left bottom. The number of pallets to be entered into the shelf facility is displayed in the section 121 of "Empty Pallets Entry Setting". The number of remaining pallets still not being entered is displayed in section 126 of "Number of Remaining Pallets". When the remaining number has turned to zero, the display is automatically returned to a Entry Setup screen shown in FIG. 7(d).

Figure 7D:
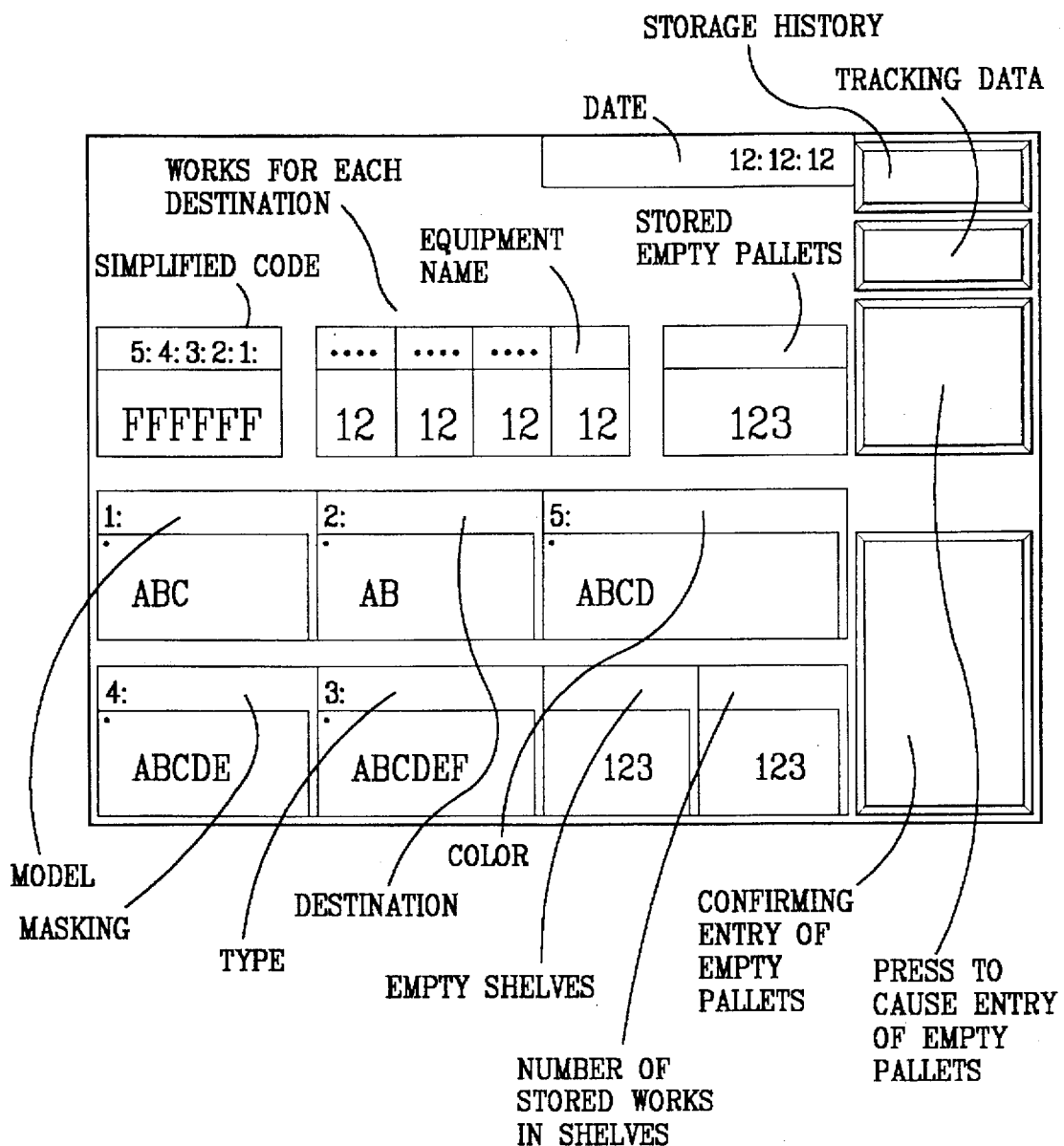

Even in the course of automatic entry with reference to the screen in FIG. 7(a), when the End/Suspend of Empty Pallets Entry section 122 is pressed, the remaining number is cancelled and returned to the same Entry Setup screen shown in FIG. 7(d) as above.

Figure 8A:
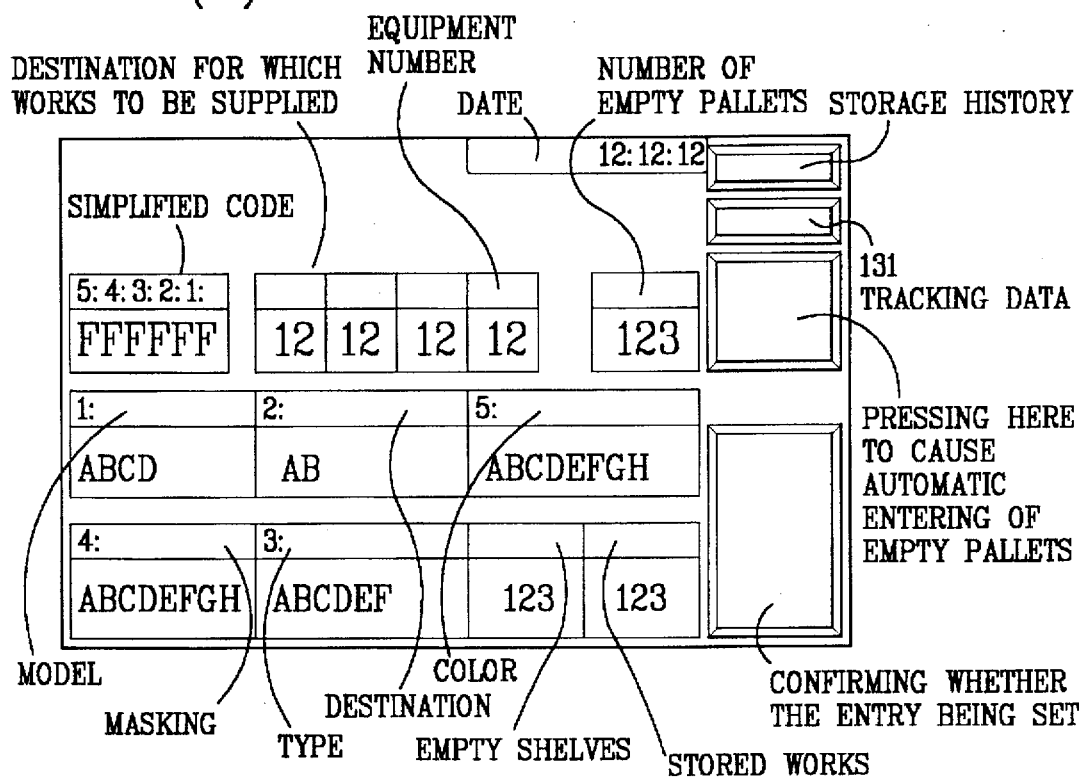
FIGS. 8(a) to (b) show display screens for displaying the storage history.
Figure 8B:
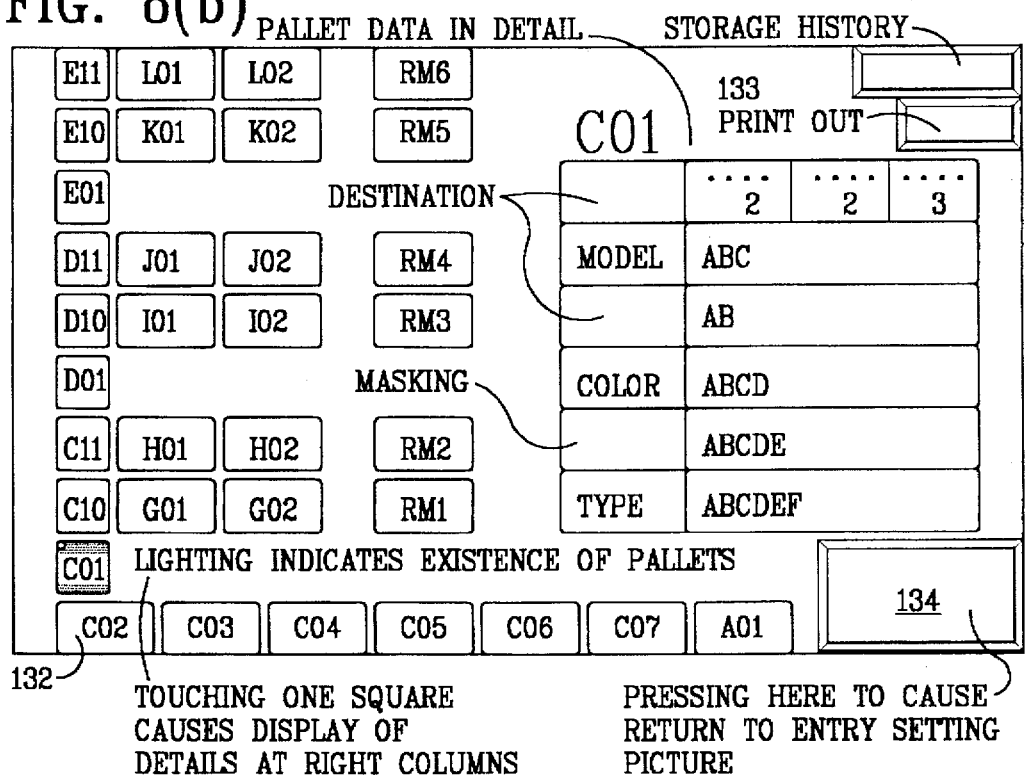

FIG. 8(a) and (b) inclusively are to display and confirm the history of entry. As shown in FIG. 8(a), a Tracking Data section 131 is pressed, the display turns to a screen as shown in FIG. 8(b) to enable confirmation of the tracking status of the pallet data of the conveyor which is used for storage entry. Then, in the displayed screen of FIG. 8(b) having a plurality of areas A01 to RM6, when the pallet data is placed therein, the display turns to an inverted image (a lamp lighting). Pressing this inverted area causes the indication of a detailed data of the area.

For example, specifying an area (C01) of the storage conveyor causes the display the detail of the pallet data. With this state, by pressing the area 133 Print Out, the image is printed as it is. Instead, by pressing the area 134 Return To Storage Setting, the display is turned to the storage setting screen.

The invention is not limited in the afore-mentioned embodiments, and, for example, various forms of the figure structure of each displayed screen is allowed on the basis of the practical conveyance path, and, in each partial screen image, the figure displayed therein may be formed as somewhat small-sized and simplified. In addition, the display for the status of each treatment may be in a combined form such that it is emphasized by either coloring, enlarging, graphic or animated expression. It is would be understood that many other modifications may be performed without deviating from the scope of the present invention.

What is claimed is:

1. A method of storage control of component works in an automated storehouse, wherein said storehouse includes a plurality of storage equipment for storage/delivery of component works conveyed by a plurality of transporters, comprising the steps of:

reviewing the condition of stored works to extract storage equipment containing storage space;

retrieving stored works having specification information the same as that of works to be stored in said storehouse;

extracting storage equipment containing a minimum amount of stored works having the same specification information;

designating the extracted storage equipment as a target for storing said works to be stored;

adding the number of stored works having specification information the same as that of said works to be stored, obtained with respect to each storage equipment, to the number of works to be stored to form a total; and retrieving the total resulting from said addition as a stored number of storage equipment.

2. A storage control apparatus for component works in an automated storehouse, wherein said storehouse includes a plurality of storage equipment for storage/delivery of component works conveyed by a plurality of transporters, comprising:

means for reviewing the condition of stored works to extract storage equipment containing storage space;

means for retrieving stored works having specification information the same as that of works to be stored in said storehouse;

means for extracting storage equipment containing a minimum amount of stored works having the same specification information;

means for designating the extracted storage equipment as a target for storing said works to be stored;

means for adding the number of stored works having specification information the same as that of works to be stored, obtained with respect to each storage equipment, to the number of works to be stored to form a total; and means for retrieving said total as the stored number of storage equipment.

* * * * *